Figure 1:
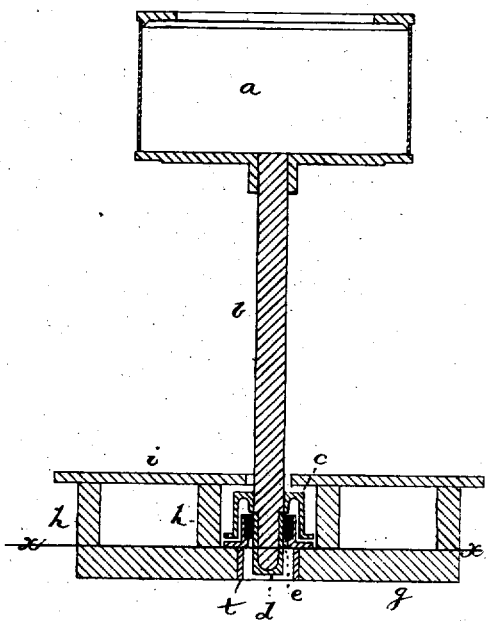

D. M. WESTON.

Self-Balancing Centrifugal Machine.

No. 8,488. Reissued Nov. 12, 1878.

Witnesses.

N. E. Whitney.

A. Hemmendal

Inventor.

David M. Weston, by Crosby & Gregory Attys

THE ECKERT LITHOGRAPHING CO., WASHINGTON, D. C.

UNITED STATES PATENT OFFICE.

DAVID M. WESTON, OF BOSTON, MASSACHUSETTS.

IMPROVEMENT IN SELF-BALANCING CENTRIFUGAL MACHINES.

Specification forming part of Letters Patent No. 82,049, dated September 8, 1868; Reissue No. 8,188, dated November 12, 1878; application filed November 1, 1878.

DIVISION A.

*To all whom it may concern:*

Be it known that I, DAVID M. WESTON, of Boston in the State of Massachusetts, have invented a new and useful Improvement in Self-Balancing Centrifugal Machines; and I do hereby declare that the following is a full, clear, and exact description of the same, reference being had to the accompanying drawings, making part of this specification, and to the letters of reference marked thereon.

The object of this invention is to avoid the injurious effects caused by the irregular or unequal distribution of material to be acted upon within the revolving cylinders of centrifugal machines, as described in the schedule annexed to the reissue of my former patent dated January 14, 1868, No. 2,845, but by the use of a different method; and the invention consists, chiefly, in a centrifugal machine composed of a cylinder or basket placed at the upper end of a rotating vertical shaft, sustained in or embraced by a box or bearing at its lower end only, the said box being surrounded by a flexible easy-yielding spring, instead of suspending it from a flexible bearing or connection above and attaching the cylinder to its lower end, as heretofore done by me, thus reversing the former method.

When an upright shaft in fixed bearings is unequally loaded and rotated at high velocity it tends to revolve eccentrically, and vibrates and jars within its bearings, thereby causing great waste of power, and limiting the speed at which the shaft may be revolved. To meet this condition of things, it is necessary that the bearing should have sufficient freedom of motion to allow the shaft and its load to find and revolve around the center of gravity of the rotating mass; that, in order to permit such rapid rotation, the spindle should have as little weight as is consistent with proper strength; that, while the shaft is free to vibrate when in a vertical position, it shall meet with a rapidly-increasing resistance when it leaves that position, so as to prevent the shaft from being thrown into gyrations, and so as to compel it to revolve as nearly as may be about its center of gravity; and that the bearing shall be connected with its fixed support by means of some flexible or elastic medium, which, by virtue of its elasticity, will permit the necessary movement of the bearing without making and breaking its contact with its support or with the shaft, otherwise the rapid succession of such contacts and impacts of their surfaces would produce a very objectionable noise and jar, and would soon derange the machine.

Centrifugal machines have been made to revolve upon an upright shaft with a pivot-bearing at the bottom; but a difficulty to be overcome has been found from their tendency to stagger or surge in starting with a charge of sugar or other semi-liquid material, which results in a heavy lurch, so great as to stop the revolution of the machine.

Partially-flexible upper bearings have been applied to the shaft near and below the cylinder, with a pulley attached between this and the lower bearing, as in the Fesca machine, imported from Berlin. These machines cannot be charged before starting, and it has been found necessary to charge the cylinder with the material to be acted upon at speed.

An improvement on this machine has been patented in the United States, enabling the operator to charge the machine while stationary, which improvement consists in the application of an adjustable fixed bearing applied above the cylinder, which is removed after starting and attaining a certain degree of speed. This requires the attention of a skillful operator to detach this adjustable bearing at the top at the proper moment.

In all centrifugal machines revolving upon fixed bearings, great weight and strength of machinery are required to obtain a proper degree of stability, and revolving as they do at a high speed, a very objectionable jar and concussion are produced.

The same difficulty arises in a proportionate degree by the attempt to control the machine by the upper flexible bearings below the cylinder above described.

Figure 2:
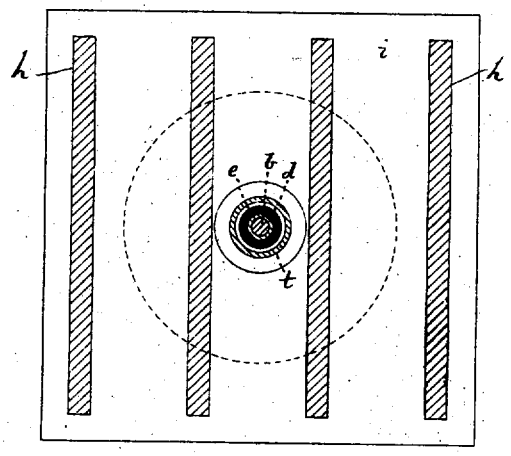

Figure 1 is a longitudinal sectional view of my invention, with the rest upon which the shaft and box are supported. Fig. 2 is a section of Fig. 1 on the line *x x*.

Referring, for the sake of comparison, to my patented machine hereinbefore referred to, it will be seen that the cylinder or basket is attached to a hollow shaft, which surrounds a shaft or spindle held by an india-rubber bushing or spring, contained within a socket attached firmly to the frame.

In reversing this contrivance I have departed from the construction shown in the former patent, in that, instead of the suspended non-rotating spindle, I have substituted an upright bearing-box, to receive the lower end of the rotating cylinder-shaft, and have attached the cylinder or receptacle *a*, which contains the material to be operated upon, directly to the upper end of the shaft or spindle *b*, upon which is placed the pulley *c*, to which the driving-belt is applied, all bearings above or just below the cylinder being thereby obviated. This shaft *b* revolves in the box *d*, suitably held and supported by the flexible easily-yielding spring *e*, made of rubber or other elastic material, placed around the outer circumference of the box *d*, within a stationary socket or fixed support, *t*, which is herein shown as securely held upon the cross-timbers *g*, below and attached firmly to the lower surface of the floor-timbers *h*, on which the floor *i* rests.

Power being applied by means of a driving-belt attached to the pulley *c* below the platform or floor, the machine commences to revolve, without any support or control to keep it in position other than the spring *e*, which is made so flexible as to have just sufficient strength to preserve the vertical position of the machine while stationary, but not so rigid as to exercise control over its revolutions in motion.

The tendency of the machine to oscillate from the center or stagger when starting is overcome without difficulty by making the upright shaft of a length not less than one and one-fourth time the diameter of the cylinder, and by the use of the spring *e*, of the flexible character above described, at the base.

It is essential that the length of the upright shaft should be such as to permit the natural oscillation of the machine in starting within such an angle as to keep the cylinder very nearly on a horizontal plane and the shaft nearly perpendicular.

The natural tendency of the machine under these conditions is to find an axis of revolution in perfect equilibrium.

The pull of the belt should be applied as nearly opposite the box as possible, to thereby reduce the tendency of the belt to strain or deflect the shaft from perpendicular position, and therefore the pulley *c* is extended down over the box *d* and the bushing.

It is obvious that a shaft supported only at its lower end in the manner herein described is practically free, within certain limits, to move bodily in any lateral direction as well as to incline from a perpendicular, thus being enabled to revolve steadily about the center of gravity determined by the unequal distribution of the load upon the shaft.

By supporting the shaft or spindle at its lower end only, its upper end is left entirely free to oscillate or vibrate under the action of an unequal distribution of its load; the length of the shaft is less than if supported at both ends, thereby reducing its weight; the friction of a bearing at the upper end of the shaft is obviated, and cost of mechanism is reduced. The power to rotate the shaft being applied substantially at or near the bearing at the lower end of the shaft also permits the upper end of the shaft to be left entirely free and unrestrained.

I claim—

1. In a centrifugal machine, the upright rotary shaft, supported at its lower end only, and the cylinder connected with the said shaft, combined with the bearing in which the shaft rests and rotates, and the easily-yielding spring outside the box, substantially as and for the purpose described.

2. The centrifugal cylinder and the upright cylinder-shaft, supported at its lower end only, and made of sufficient length with reference to the diameter of the cylinder, as described, to prevent the excessive angular oscillation of the machine, combined with the support for the said shaft and yielding spring, operating as set forth.

In testimony whereof I have hereunto set my hand and seal.

DAVID M. WESTON. [L. S.]

Witnesses:
G. W. GREGORY,
N. E. WHITNEY.